N. C. GALLIHER.
CHANGEABLE SPEED GEAR.
APPLICATION FILED JULY 5, 1916.
1,218,176.
Patented Mar. 6, 1917.
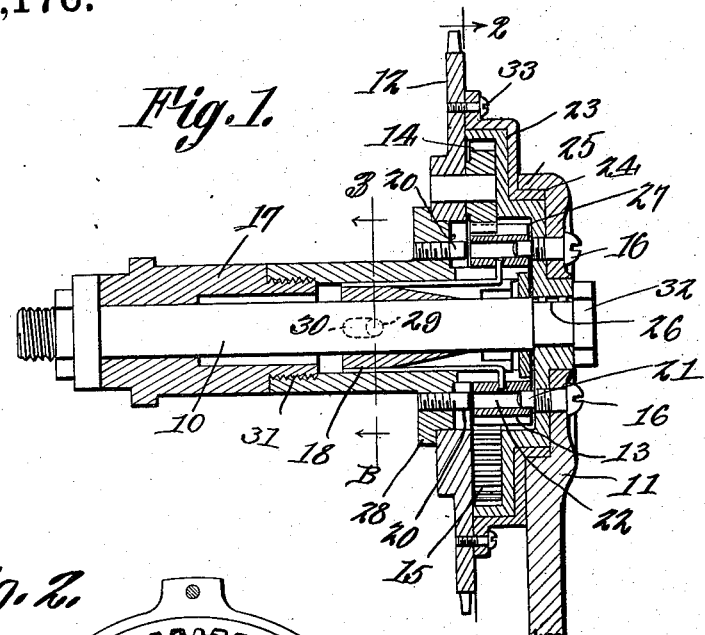
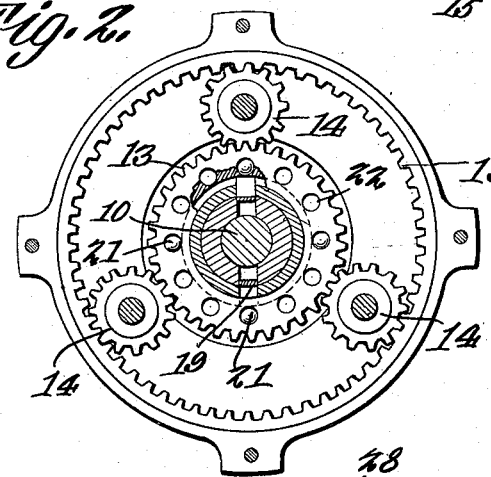
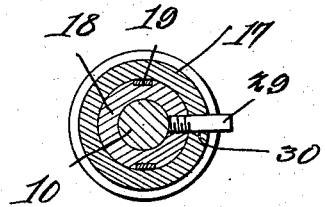
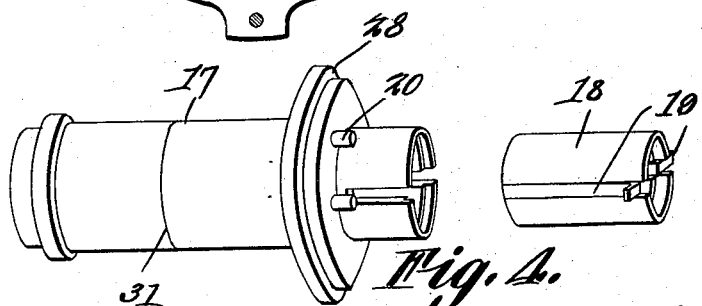
N. C. Galliher, Inventor,
by C. A. Snow & Co., Attorneys
Witnesses

UNITED STATES PATENT OFFICE.

NATHANIEL C. GALLIHER, OF BRISTOL, VIRGINIA.

CHANGEABLE-SPEED GEAR.

1,218,176.  Specification of Letters Patent.  Patented Mar. 6, 1917.

Application filed July 5, 1916. Serial No. 107,634.

*To all whom it may concern:*

Be it known that I, NATHANIEL C. GALLIHER, a citizen of the United States, residing at Bristol, in the county of Washington and State of Virginia, have invented a new and useful Changeable-Speed Gear, of which the following is a specification.

The object of the invention is to provide a simple and comparatively inexpensive changeable speed gear wherein the shift from one speed to the other may be accomplished with facility, with the minimum relative movement of the parts and with the minimum risk of injury thereto as by stripping or otherwise.

Further objects and advantages will appear as the description proceeds, it being understood that changes in the precise embodiment of the invention herein disclosed, can be made within the scope of what is claimed, without departing from the spirit of the invention.

In the drawings:—

Figure 1 is a longitudinal or axial section of a gear constructed in accordance with the invention.

Fig. 2 is a sectional view on the plane indicated by the line 2—2 of Fig. 1.

Fig. 3 is a sectional view on the plane indicated by the line 3—3 of Fig. 1.

Fig. 4 is a detail view in perspective of the hub and the gear shifting slide detached therefrom.

The device consists essentially of a driving member, consisting in the construction illustrated of a crank shaft 10 to which is shown attached a crank 11, a driven member 12 consisting as illustrated of a sprocket wheel rotatable on the casing, an axially shiftable sun gear 13, planetary gears 14 and a master gear 15 which is of the internal toothed type, said master gear being carried and driven by the driving member, and being shown in the drawing, connected with the head of the crank by means of fastening screws 16, while the planetary gears are mounted upon and carried by the sprocket or driven member. The drive or crank shaft is mounted in a hub or casing 17 and fitted therein is a shifting slide 18 whose spring detents 19 engage the inner annular groove of the sun gear 13 which latter is adapted to be locked either to the stationary hub or casing by means of studs 20 or to the driving member by means of pins or studs 21 shown in the drawing as being formed as continuations of the fastening screws 16, said sun gear being provided with a plurality of openings or sockets 22 for the reception of said studs.

Obviously when the sun gear is in engagement with the studs of the driving member, all of the gears including the sun gear, planetary gears and master gear are rotated at the same speed as the driving member and directly thereby, whereas when the sun gear is anchored or engaged with the stationary casing by engagement with the studs 20 on said stationary member, the planetary gears travel around the sun gear, impelled by the master gear and communicate motion to the driven member at a speed which is less than that of the driving member, whereby increased power is developed, as to hill climbing and the like.

A gear casing 23 is secured to the sprocket wheel and is flanged as at 24, said flange being overlapped by a flange 25 on the crank head to form a dust-proof joint.

It will be observed moreover that the master or internal gear is keyed as at 26 to the projecting end of the crank shaft, being provided with an offset or cavity 27 for the reception of the sun gear when engaged with the studs of the driving member, and that a very slight axial movement of the sun gear is sufficient to disengage it from the stationary member and engage it with the driving member, and that the parts are compactly arranged so as to minimize the width of the tread of the machine in connection with which the gear is employed. The hub or casing is flanged at 28 to overlap and form a dust guard for the sprocket wheel, and while not illustrated it will be further understood that anti-friction bearings may be employed at various points between relatively moving parts in order to minimize resistance and wear.

A shift pin 29 which may be operated by any suitable means (not shown) is attached to the shift sleeve 18 and projects through a slot 30 in the hub or casing.

The hub or casing is preferably sectional being jointed as at 31 and access to the gears may be obtained by the removal of the nut 32 threaded upon the extremity of the crank shaft, and the removal of the screws 33 by which the gear casing is secured to the socket.

What is claimed is:—

A change speed gearing embodying a casing, a shaft therein having one end projecting therefrom, a sun gear slidable and rotatable upon one end of the casing and having an inner annular groove, a slide movable within the casing, a member carried by the slide engaging said groove, a driven member rotatable upon the casing, a planetary gear carried by the driven member and meshing with the sun gear, and a driving member upon said end of the shaft having an internal gear meshing with the planetary gear, the casing and driving member having means for the alternate engagement of the sun gear.

In testimony that I claim the foregoing as my own, I have hereto affixed my signature in the presence of two witnesses.

NATHANIEL C. GALLIHER.

Witnesses:
J. W. SPICER,
B. T. COCKE.

Copies of this patent may be obtained for five cents each, by addressing the "Commissioner of Patents, Washington, D. C."